United States Patent
Ichikawa et al.

(10) Patent No.: US 10,065,781 B2
(45) Date of Patent: Sep. 4, 2018

(54) SPOUT FOR POUCH, SPOUT-ATTACHED POUCH, AND MANUFACTURING METHOD FOR SPOUT FOR POUCH

(71) Applicant: Hosokawa Yoko Co., Ltd., Tokyo (JP)

(72) Inventors: Toru Ichikawa, Misato (JP); Tomonari Shinohara, Iruma-gun (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 0 days.

(21) Appl. No.: 15/317,776

(22) PCT Filed: Jun. 23, 2015

(86) PCT No.: PCT/JP2015/068076
§ 371 (c)(1),
(2) Date: Dec. 9, 2016

(87) PCT Pub. No.: WO2015/199085
PCT Pub. Date: Dec. 30, 2015

(65) Prior Publication Data
US 2017/0121085 A1    May 4, 2017

(30) Foreign Application Priority Data
Jun. 23, 2014  (JP) .................................. 2014-128046

(51) Int. Cl.
*B65D 75/58*   (2006.01)
*B29C 45/14*   (2006.01)
(Continued)

(52) U.S. Cl.
CPC ...... *B65D 75/5883* (2013.01); *B29C 45/0046* (2013.01); *B29C 45/14* (2013.01);
(Continued)

(58) Field of Classification Search
CPC ........ B29C 2045/0027; B29C 45/0046; B29C 45/14; B29C 45/14622; B29L 2031/712; B65D 75/5883; B65D 81/24; B65D 41/04
See application file for complete search history.

(56) References Cited

U.S. PATENT DOCUMENTS 5,181,365 A * 1/1993 Garvey .................. B65B 9/093
                                                493/196
6,722,531 B2 * 4/2004 Matsuo .................. B65D 35/12
                                                215/42
(Continued)

FOREIGN PATENT DOCUMENTS

CN    101287581 A    10/2008
JP    64-039253    3/1989
(Continued)

OTHER PUBLICATIONS

International Search Report, PCT/JP2015/068076, dated Jul. 28, 2015 (4 pages).
Chinese Office Action (Applciation No. 2015-80032581.X) dated Mar. 30, 2018, with English language translation.

*Primary Examiner* — Paul R Durand
*Assistant Examiner* — Bob Zadeh
(74) *Attorney, Agent, or Firm* — Nixon Peabody LLP; Jeffrey L. Costellia

(57) ABSTRACT

In the present invention, a blocking tube (11) has a tubular blocking layer (11a) made of a material having barrier properties, and a tubular covering layer (11b) which is disposed in contact with at least the inner peripheral surface of the blocking layer (11a) and is made of a material of the same quality as a base resin. One end portion of the covering layer (11b) protrudes further toward the outside than an end portion of the blocking layer (11a) which is disposed on the outer periphery side. In the blocking tube (11), the inner peripheral surface of the covering layer (11b) forms the inner surface of a pouring hole (5), and the end face on the (Continued)

one end portion side in an axial direction of the covering layer (11b) and the outer peripheral surface of the covering layer (11b), which protrudes from an end portion in the axial direction of the blocking layer (11a) are embedded in the base resin in contact with the base resin.

1 Claim, 10 Drawing Sheets

(51) Int. Cl.
  *B65D 81/24* (2006.01)
  *B65D 41/04* (2006.01)
  *B29C 45/00* (2006.01)
  *B29L 31/00* (2006.01)

(52) U.S. Cl.
  CPC ........ *B29C 45/14622* (2013.01); *B65D 41/04* (2013.01); *B65D 81/24* (2013.01); *B29C 2045/0027* (2013.01); *B29L 2031/712* (2013.01)

(56) References Cited

U.S. PATENT DOCUMENTS

| | | | |
|---|---|---|---|
| 8,403,186 B2* | 3/2013 | Kurosawa | B29C 45/14598 138/148 |
| 2005/0040181 A1* | 2/2005 | Kurosawa | B65D 75/5883 222/92 |
| 2006/0201967 A1* | 9/2006 | Romer | B65D 51/225 222/92 |
| 2009/0008416 A1* | 1/2009 | Kurosawa | B29C 45/14598 222/566 |
| 2017/0121085 A1* | 5/2017 | Ichikawa | B65D 41/04 |

FOREIGN PATENT DOCUMENTS

| | | | | |
|---|---|---|---|---|
| JP | 2006-001623 | 1/2006 | | |
| JP | 2007-106498 | 4/2007 | | |
| JP | 2007-238104 | 9/2007 | | |
| JP | 2009-280215 | 12/2009 | | |
| JP | 4424204 B2 * | 3/2010 | | B29C 45/14778 |
| WO | WO 2004/013008 A1 | 2/2004 | | |
| WO | WO 2004/013008 | 12/2004 | | |
| WO | WO 2007/102566 | 9/2007 | | |

* cited by examiner

SPOUT FOR POUCH, SPOUT-ATTACHED POUCH, AND MANUFACTURING METHOD FOR SPOUT FOR POUCH

TECHNICAL FIELD

The present invention relates to a spout for a pouch, which is attached to a pouch in order to pour the contents in the pouch, a spout-attached pouch, and a method of manufacturing the spout for a pouch.

Priority is claimed on Japanese Patent Application No. 2014-128046, filed Jun. 23, 2014, the content of which is incorporated herein by reference.

BACKGROUND ART

In recent years, a spout-attached pouch, which is referred to as a spout pouch, has been in widespread use. In the spout-attached pouch, a spout made of resin is integrally attached to an upper portion of a pouch composed of a resin film which is referred to as a soft packaging and a barrier material such as aluminum, and after the pouch is filled with the contents, a resin cap for sealing is attached to an end portion of the spout.

The feature of the spout-attached pouch is that it is lightweight and that it can be made into a flat shape in the states before use and after use, and thus it does not take up space. Therefore, a reduction in transportation charges or a reduction in waste is possible. Further, in the spout-attached pouch, since the pouch itself is soft, the extrudability (squeezability) of the contents is excellent, and for example, in a case of goods such as mayonnaise or ketchup, it is possible to reduce the amount of air in a container, compared to that in a glass bottle or a hard container. Therefore, the spout-attached pouch is suitable as a container for like of mayonnaise or ketchup, which are easily oxidized, cooking oil, alcoholic liquors, seasonings, or dairy products such as condensed milk.

Although, in the spout-attached pouch, in a pouch part, it is possible to provide sufficient gas barrier properties by selecting and laminating a film having gas barrier properties, on the other hand, in a spout part, if it is configured of a single-substance resin such as polyethylene or polypropylene, in terms of gas barrier properties, this cannot be considered to be sufficient.

Further, in a case where the contents are fruit juice or the like having a low viscosity, since the contents in the spout-attached pouch will circulate due to vibration during distribution, changes in temperature at the time of being stocked, or the like, it is difficult for the deterioration of the contents due to oxidation to be manifested. However, in a case where the contents are the above-mentioned mayonnaise, ketchup, or the like, the viscosity thereof is high, and therefore, the contents are prone to stay in the vicinity of the spout for a long period of time and there is a possibility that the contents may deteriorate due to oxidation.

As a spout for a pouch for coping with these problems, a spout in which a metal pipe having gas barrier properties is embedded in a peripheral wall surrounding a pouring hole of the spout has been devised (refer to Patent Document 1, for example).

In this spout for a pouch, although the ingress of oxygen from the outside can be blocked by the embedded metal pipe, the manufacturing costs are liable to be higher due to the use of the metal pipe.

For this reason, as an alternative spout for a pouch to this, a spout in which a blocking tube made of a resin material which has excellent gas barrier properties is embedded in a peripheral wall surrounding a pouring hole of the spout has been devised (refer to Patent Documents 2 and 3, for example).

In the spouts for a pouch disclosed in Patent Documents 2 and 3, the blocking tube which is embedded in a base resin of the peripheral wall has a tubular blocking layer made of a material having barrier properties, such as ethylene-vinyl alcohol copolymer resin (EVOH), and a tubular covering layer which is disposed in contact with at least the inner peripheral surface of the blocking layer, and the covering layer is formed of a resin material of the same quality as the base resin, which is easily joined to the base resin.

In a case of manufacturing this spout for a pouch, the blocking tube is disposed in a mold in a state of being externally fitted to a shaft part of the mold for molding the pouring hole, and in this state, a melted base resin is injected and filled into a cavity of the mold. In this way, the melted base resin goes around the end face in an axial direction and the outer periphery side of the blocking tube in the mold, and when the base resin is solidified in the mold, the base resin is joined to the covering layer of the blocking tube.

PATENT DOCUMENT PATENT DOCUMENT

[Patent Document 1] Japanese Unexamined Utility Model Application, First Publication No. S64-39253

[Patent Document 2] Japanese Unexamined Patent Application, First Publication No. 2006-1623

[Patent Document 3] Japanese Unexamined Patent Application, First Publication No. 2007-238104

SUMMARY OF INVENTION

Technical Problem

However, in the spouts for a pouch disclosed in Patent Documents 2 and 3, the blocking layer of the blocking tube which is embedded in the base resin and the covering layer which is disposed on the inner periphery side of the blocking layer are formed to have the same axial length, and therefore, when the blocking tube is integrated with the base resin at the time of molding, the covering layer of the blocking tubes joined to the base resin at only the end face in the axial direction. For this reason, the area of the joining portion between the covering layer of the blocking tube and the base resin is reduced, and in particular, in a case where it is necessary to thin the thickness of the covering layer, or the like, there is a concern that the covering layer may peel from the base resin or the blocking layer.

Further, in the spouts for a pouch disclosed in Patent Documents 2 and 3, the end face in the axial direction of the blocking tube which is embedded in the base resin is configured by a flat surface substantially orthogonal to the axial direction. For this reason, when the blocking tube is disposed in the mold and the melted base resin is injected into the mold along the axial direction, a large flow pressure of the injected resin is prone to act on the end face of the blocking tube. If a large flow pressure of the melted base resin acts on the end face of the blocking tube at the time of the manufacturing of the spout for a pouch, there is a concern that an end portion in the axial direction of the blocking tube may be turned up under the flow pressure or heat may be generated by an exothermic shearing phenomenon. Further, if the end portion in the axial direction of the blocking tube is changed or deformed under the flow pressure of the melted base resin, there is also a concern that smooth inflow of the base resin to the mold may be inhibited.

Therefore, the present invention provides a spout for a pouch in which it is possible to more reliably suppress peeling of a covering layer of a blocking tube, and at the time of manufacturing, it is possible to suppress deformation or vibration of the blocking tube due to the flow pressure of a melted base resin and it is possible to make the melted base resin smoothly flow into a mold, a spout-attached pouch, and a method of manufacturing the spout for a pouch.

Solution to Problem

According to an aspect of the present invention, a spout for a pouch is provided, including: a pouring hole which allows the inside and the outside of a pouch to communicate with each other; and a blocking tube which is embedded in a base resin of a peripheral wall surrounding the pouring hole, wherein the blocking tube has a tubular blocking layer, and a tubular ring layer which is disposed in contact with at least an inner peripheral surface of the blocking layer and is made of a material of the same quality as the base resin, one end portion in an axial direction of the covering layer is disposed to protrude further toward the outside in the axial direction than an end portion on the same side in the axial direction of the blocking layer which is disposed on the outer periphery side, and in the blocking tube, an inner peripheral surface of the covering layer forms an inner surface of the pouring hole, and an end face on the one end portion side in the axial direction of the covering layer and an outer peripheral surface of the covering layer, which protrudes from an end portion in the axial direction of the blocking layer to the outside in the axial direction, are embedded in the base resin in contact with the base resin.

In this way, the one end portion side in the axial direction of the blocking tube is embedded in the base resin with not only the end face in the axial direction of the covering layer, but also the outer peripheral surface of the covering layer, which protrudes from the end portion in the axial direction of the blocking layer, being in contact with the base resin. For this reason, the area of the joining portion between the covering layer and the base resin in the vicinity of one end portion in the axial direction of the blocking layer of the blocking tube increases, and thus it becomes possible to more reliably prevent the covering layer from peeling from the base resin or the blocking layer.

Further, at the time of the manufacturing of the spout a pouch, it is possible to form the spout for a pouch by disposing the blocking tube with the blocking layer and the covering layer integrated with each other in the mold, and in this state, injecting and filling the melted base resin into the mold. At this time, even in a case where the base resin injected into the mold strongly comes into contact with one end portion in the axial direction of the blocking tube along the axial direction, since on the one end portion side of the blocking tube, the covering layer on the inner periphery side protrudes further toward the outside in the axial direction than the blocking layer on the outer periphery side, the melted base resin is guided by a stepped portion between the covering layer and the blocking layer, thereby gradually changing direction so as to follow the outer peripheral surface of the blocking layer, and smoothly flows to the outer periphery side of the blocking layer. As a result, it becomes difficult for a large flow pressure of the melted base resin to act on one end portion in the axial direction of the blocking tube, and the base resin easily flows to an end portion of the mold.

It is preferable that the blocking tube be formed in tapered shape in which the blocking tube tapers toward the one end portion side in the axial direction.

In this case, at the time of the manufacturing of the spout for a pouch, if the melted base resin flows in toward one end portion in the axial direction of the blocking tube set in the mold, the base resin flows more smoothly to the outer periphery side of the blocking layer along the tapered shape of the blocking tube. Further, in a case where the blocking tube is fitted onto the shaft part of the mold at the time of injection-molding of the spout, it is possible to easily perform the fitting by using the tapered shape of the blocking tube. Further, also in a case where the solidified molded product is removed from the shaft part of the mold, it is possible to easily perform the removal by using the tapered shape of the blocking tube.

An end portion restriction wall with which an end face on the other end side in the axial direction of the blocking layer comes into contact may be formed at the other end portion in the axial direction of the covering layer.

In this case, when the blocking layer and the covering layer are assembled in advance, the blocking layer and the covering layer can be easily positioned by bringing the end face of the blocking layer into contact with the end portion restriction wall of the covering layer. Further, when the blocking tube is set in the mold and the melted base resin is injected and filled into the mold, even in a case where the melted base resin strongly comes into contact with the one end portion side in the axial direction of the blocking tube, it is possible to prevent the occurrence of a position shift between the blocking layer and the covering layer.

According to another aspect of the present invention, a spout-attached pouch is provided in which the spout for a pouch according to any one of the above is attached to a pouch.

According to still another aspect of the present invention, a method of manufacturing a spout for a pouch is provided, which has a pouring hole making the inside and the outside of the pouch communicate with each other, and in which a blocking tube is embedded in a base resin of a peripheral wall surrounding the pouring hole, the method including: a process of forming the blocking tube by preparing a tubular blocking layer and a tubular covering layer made of a material of the same quality as the base resin and assembling the blocking layer such that at least an inner peripheral surface of the blocking layer is in contact with the outer periphery side of the covering layer and one end portion side in an axial direction of the covering layer protrudes further toward the outside in the axial direction than an end portion on the same side in the axial direction of the blocking layer; a process of externally fitting the blocking tube onto a shaft part of a mold for molding a pouring hole, and in this state, setting the blocking tube in the mold such that the one end portion side in the axial direction of the covering layer faces an introduction direction of the base resin; and a process of injecting and filling a melted base resin into the mold such that the base resin goes around an end face on the one end portion side in the axial direction of the covering layer, an outer peripheral surface of the covering layer, which protrudes from an end portion in the axial direction of the blocking layer to the outside in the axial direction, and the outer periphery side of the blocking layer.

Effects of Invention

According to the present invention, the end face on the one end portion side in the axial direction of the covering layer of the blocking tube and the outer peripheral surface of the covering layer, which protrudes from the end portion in the axial direction of the blocking layer, are embedded in the base resin in contact with the base resin, and therefore, it is possible to more reliably prevent the covering layer from peeling from the base resin or the blocking layer.

Further, according to the present invention, when disposing the blocking tube in the mold and injection-molding the spout for a pouch, the flow of the melted base resin can be smoothly guided to the outer periphery side of the blocking layer by a stepped portion between the covering layer and the blocking layer of the blocking tube. For this reason, the end portion in the axial direction of the blocking tube on the side to which the melted base resin is introduced can be prevented from being turned up or vibrating under the flow pressure of the base resin, and it is possible to make the melted base resin smoothly flow into the mold. Therefore, according to the present invention, it is possible to improve the product quality spout for a pouch and it is possible to attain improvement in production efficiency.

DESCRIPTION OF EMBODIMENTS

Hereinafter, an embodiment of the present invention will be described based on the drawings.

Figure 1:
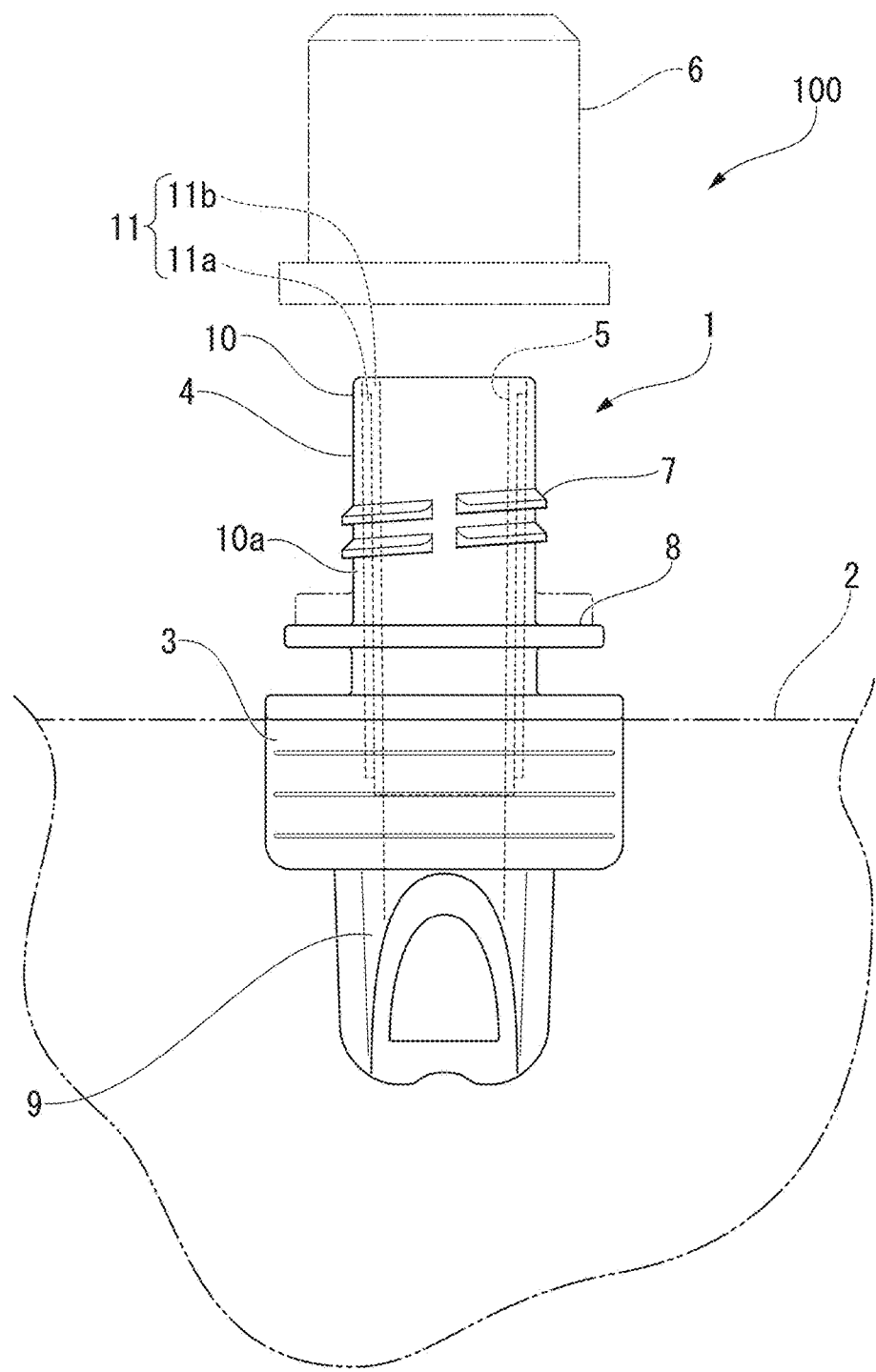
FIG. 1 is a side view of a spout for a pouch of an embodiment of the present invention.
Figure 2:
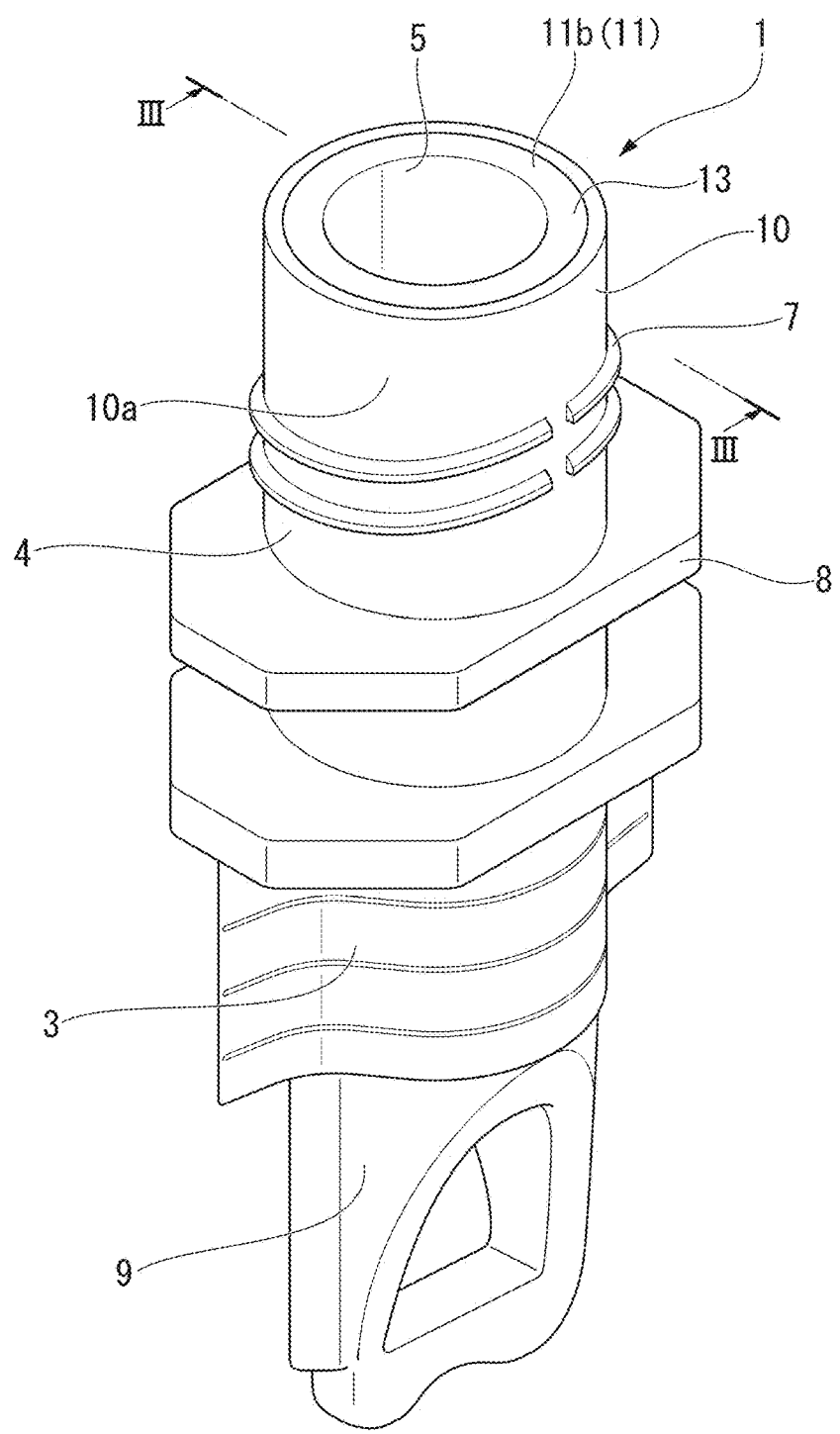
FIG. 2 is a perspective view of the spout for a pouch of the embodiment of the present invention.
Figure 3:
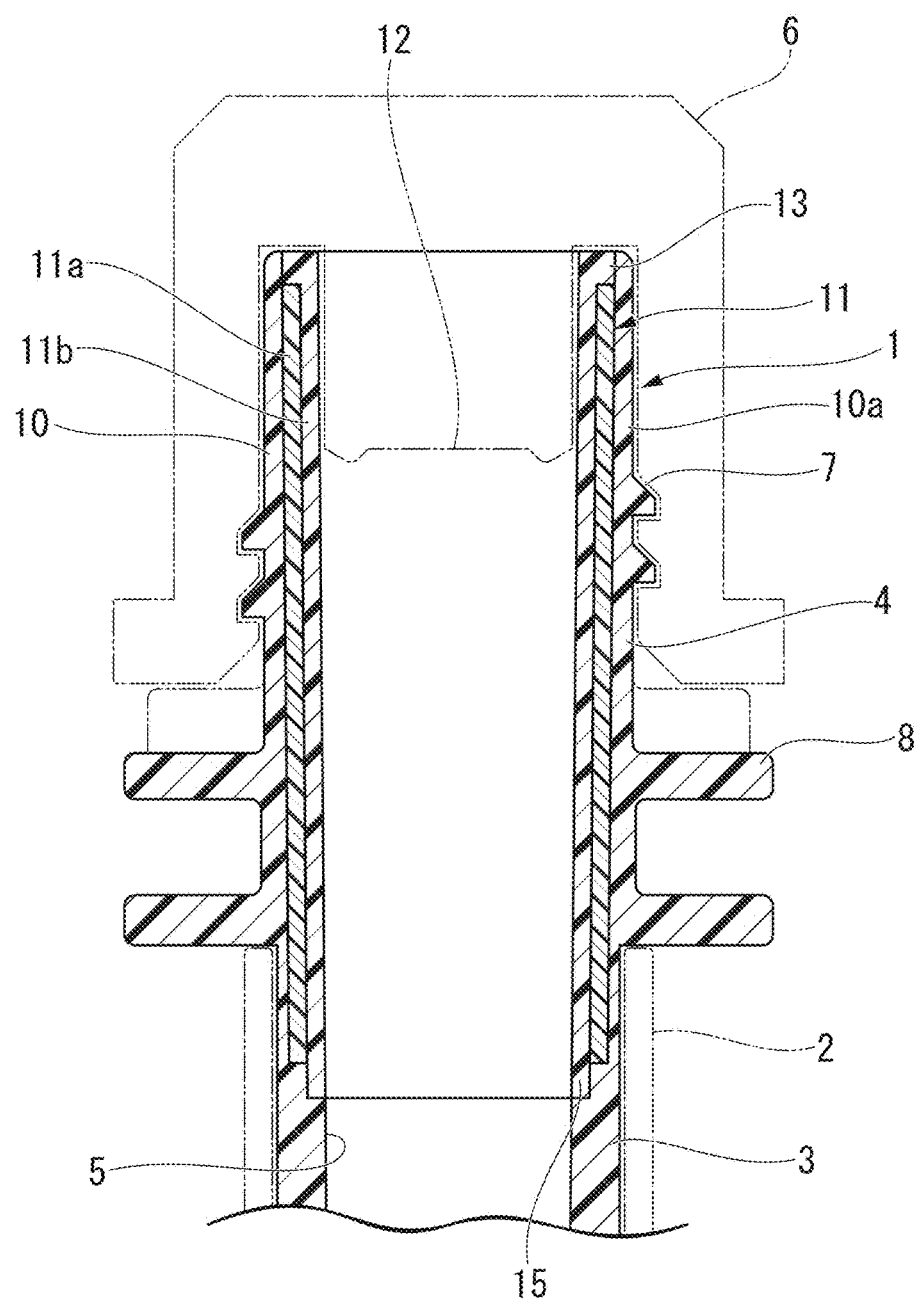
FIG. 3 is a sectional view corresponding to a cross-section along line III-III of FIG. 2 of the spout for a pouch of the embodiment of the present invention.

FIGS. 1 to 3 are diagrams showing a spout for a pouch 1 (hereinafter defined as a "spout 1") of this embodiment. The spout 1 of this embodiment is integrally attached to a sealed pouch 2, whereby a spout-attached pouch 100 (refer to FIG. 1) is configured. The pouch 2 is formed of a laminated film in which resin and a material having barrier properties, such as aluminum, are laminated on each other.

The spout 1 is provided with an adhesion part 3 which is inserted into the pouch 2 and in which the inner surface of the pouch 2 is welded and fixed to the outside surface thereof by heat sealing, a mouth part 4 which is formed to be continuous to one end in an axial direction of the adhesion part 3 and protrudes from the pouch 2 to the outside, and an outflow guide part 9 which is formed to be continuous to the other end in the axial direction of the adhesion part 3 and protrudes into the pouch 2.

The mouth part 4 is formed in a substantially cylindrical shape, and the adhesion part 3 is formed to have a substantially elliptical cross-sectional shape slightly larger than the outer diameter of the mouth part 4. The cross-section of the adhesion part 3 is precisely formed in a substantially elliptical shape in which both end portions on the major axis side are crushed flatly. In this way, in a state where the adhesion part 3 of the spout 1 is inserted into the pouch 2, the facing film faces of the pouch 2 are welded and fixed to the outside surface of the adhesion part 3 without clearance. The outflow guide part 9 is formed in a substantially cylindrical shape in which a joining portion to the adhesion part 3 is slightly smaller than a minor axis portion of the adhesion part 3.

Further, a continuous pouring hole 5 having a circular cross-section is formed at the axial center positions of the mouth part 4, the adhesion part 3, and the outflow guide part 9. In the pouring hole 5, in a state where the spout 1 is attached to the pouch 2, an end portion on the outflow guide part 9 side communicates with the inside of the pouch 2 and an end portion on the mouth part 4 side is open to the outside of the pouch 2. In this embodiment, a peripheral wall 10 surrounding the pouring hole 5 is formed over an area from the mouth part 4 to the outflow guide part 9. Further, the outflow guide part 9 has a shape in which the opposite positions of the outer peripheral surface of a cylindrical wall are cut obliquely, and thereby an end portion of the pouring hole 5 is open in two opposite directions at the outflow guide part 9.

A resin cap 6 for sealing an opening of the pouring hole 5 is detachably screwed to the mouth part 4. A thread 7 to which the cap 6 is screwed is formed on the outer peripheral surface of the mouth part 4. Further, a locking flange 8 protruding to the outside in a radial direction is integrally formed on the outer peripheral surface on the side close to the adhesion part 3, of the mouth part 4. The locking flange 8 is provided so as to make it easier to grip the spout-attached pouch 100 when transporting it.

A main part of the whole of the spout 1 is formed of resin (hereinafter defined as a "base resin") such as polyethylene or polypropylene, and a substantially cylindrical blocking tube 11 which includes a layer made of a material which has excellent oxygen barrier properties is embedded in a peripheral portion of the pouring hole 5, as shown in FIG. 3. The blocking tube 11 of this embodiment has a substantially cylindrical blocking layer 11a made of a material which has excellent oxygen barrier properties, such as ethylene-vinyl alcohol copolymer resin (EVOH), and a substantially cylindrical covering layer 11b which is disposed in contact with the inner peripheral surface of the blocking layer 11a and is made of a material which is the same or has the same quality as the base resin (a material which is easily joined in close contact with the base resin). The blocking layer 11a is fitted onto the outer peripheral surface of the covering layer 11b and integrated with the covering layer 11b.

If the oxygen permeability of the blocking tube 11 is preferably less than or equal to 0.03 ml/piece·day·MPa, and further preferably, less than or equal to 0.015 ml/piece·day·MPa, under conditions that the measure environment is 20° C.-65%, it is possible to prevent oxidation of the contents in storage.

As the blocking layer 11a, it is possible to use a material which includes ethylene-vinyl alcohol copolymer resin (EVOH) as a base and is obtained by further polymerizing polyolefin resin for the purpose of increasing moldability. Further, as the material which has excellent oxygen barrier properties, which is adopted for the blocking layer 11a, it is not limited to ethylene-vinyl alcohol copolymer resin, and it is also possible to use polyvinylidene chloride (PVDC) or the like. Further, the material having oxygen barrier properties, which is adopted for the blocking layer 11a, is not limited to a resin material and may be a metal material such as aluminum or an aluminum alloy including a duralumin.

Further, as the blocking a layer 11a, the following may be used. For example, a multi-layer laminated body having at least two or more layers composed of metal foil such as aluminum and a plastic film may also be used. Specifically, for example, a layer structure such as polyethylene/aluminum/polyethylene may be adopted, and a structure such as polyethylene/aluminum foil/polyethylene terephthalate/polyethylene may also be adopted.

Further, as a multi-layer laminated body having at least two or more layers composed of plastic films, a multi-layer laminated body which includes a layer formed by vapor-depositing metal or metal oxide on y plastic film may be adopted. Specifically, for example, a layer structure such as polyethylene/vapor-deposited polyethylene terephthalate/polyethylene may be adopted, and a structure such as polyethylene/vapor-deposited nylon/polyethylene may also be adopted.

In this embodiment, the blocking tube 11 which includes a layer made of a material which has excellent oxygen barrier properties is used. For example, the blocking tube 11 may include a layer made of a material which has excellent barrier properties against gases other than oxygen, or include a layer made of a material which has excellent barrier properties against light such as ultraviolet rays.

In a case of providing barrier properties against light, by making total light transmittance be preferably less than or equal to 30% and further preferably less than or equal to 10%, it is possible to prevent deterioration of the contents due to light during storage.

In a case where the blocking layer 11a which has excellent barrier properties against light such as ultraviolet rays is used in the blocking tube 11, it is possible to provide barrier properties against light, for example, by adding a pigment to resin. As the pigment which is added to resin, an inorganic pigment such as carbon black or titanium oxide can be used.

Such a pigment can be added to the entirety of the spout 1, that is, not only the blocking layer 11a, but also the covering layer 11b or the base resin. For this reason, in a case where the pigment is added to only the blocking layer 11a of the blocking tube 11, the blocking tube 11 having common barrier properties and color can be shared by spouts having different shapes or specifications. Therefore, in a case of using this technique, it is possible to increase production efficiency when performing large item small volume production. Further, in this technique, since it is not necessary to add a pigment to the base resin which is injected and filled into a mold, it is possible to eliminate the problem that the inside of the mold becomes dirty due to a pigment.

Further, by making the blocking layer 11a of the blocking tube 11 have a multilayer of a combination of a barrier layer against light and a gas barrier layer, it is also possible to provide barrier properties against both fight and gas.

Here, if a part (a part except for the blocking tube 11) formed of the base resin, of the peripheral wall 10 of the spout 1, is defined as a peripheral wall main body part 10a, the blocking tube 11 is embedded over an area extending from an end portion (an end portion on the side which is open to the outside) of the mouth part 4 to a portion of the adhesion part 3, of the peripheral wall main body part 10a, as shown in FIG. 3. Further, the blocking tube 11 blocks oxygen which tries to infiltrate into the spout 1 by penetrating the spout 1. For this reason, the adhesion part 3 is disposed inside of the pouch 2 such that oxygen does not substantially penetrate, and therefore, due to the disposition of the blocking tube 11 in the above range, it is possible to substantially block the infiltration of oxygen into the spout 1.

Further, a seal part 12 which has a short shaft column shape and comes into close contact with the inner peripheral surface on the one end side in the axial direction in the pouring hole 5 when the cap 6 is screwed to the mouth part 4 of the spout 1 is provided on the inner surface of the cap 6 made of resin.

Further, both the blocking layer 11a and the covering layer 11b of the blocking tube 11 are formed in a substantially cylindrical shape, as described above. However, the axis of the covering layer 11b is longer than the axis of the blocking layer 11a on the inner periphery side of the blocking layer 11a. If the side facing the inside of the pouch 2 when the spout 1 is attached to the pouch 2 is defined as a pouch side with respect to the axial direction of the blocking tube 11 and the side facing the outside of the pouch 2 is defined as an anti-pouch side, an end portion on the pouch side of the covering layer 11b of the blocking tube 11 protrudes further toward the outside in the axial direction than an end portion on the pouch side of the blocking layer 11a. An area protruding further toward the outside in the axial direction than the blocking layer 11a, of the end portion on the pouch side of the covering layer 11b, is hereinafter defined as a protrusion area 15.

On the other hand, an end portion on the anti-pouch side of the covering layer 11b of the blocking tube 11 protrudes further toward the outside in the axial direction than an end portion on the anti-pouch side of the blocking layer 11a. Further, an end portion restriction wall 13 protruding in a flange shape toward the outside in the radial direction is integrally formed at the protrusion portion. The end portion restriction wall 13 restricts excessive displacement in an anti-pouch direction of the blocking layer 11a due to the end face on the anti-pouch side of the blocking layer 11a coming into contact with the end portion restriction wall 13 when the blocking layer 11a is fitted onto the outer peripheral surface of the covering layer 11b. Further, the radially outward overhanging width of the end portion restriction wall 13 is set to the same size as the thickness of an outer end portion of the blocking layer 11a.

Further, both the covering layer 11b and the blocking layer 11a of the blocking tube 11 are formed in a tapered shape in which the inner diameter and the outer diameter become gradually narrower toward the end portion on the pouch side from the end portion on the anti-pouch side, rather than a cylindrical shape having constant inner and outer diameters.

The blocking tube 11 is embedded over the area extending from the end portion of the mouth part 4 to a portion of the adhesion part 3, of the peripheral wall main body part 10a, as described above. For this reason, the inner peripheral surface of the covering layer 11b of the blocking tube 11 embedded in this way configures a portion of the inner peripheral surface of the pouring hole 5. Further, the blocking tube 11 is embedded in the base resin with the end face on the pouch side of the covering layer 11b and the outer peripheral surface of the protrusion area 15 being in contact with the base resin. Further, the blocking tube 11 is embedded in the base resin with the outer peripheral surface of the blocking layer 11a and the outer peripheral surface of the end portion restriction wall 13 of the covering layer 11b being also in contact with the base resin.

Figure 4:
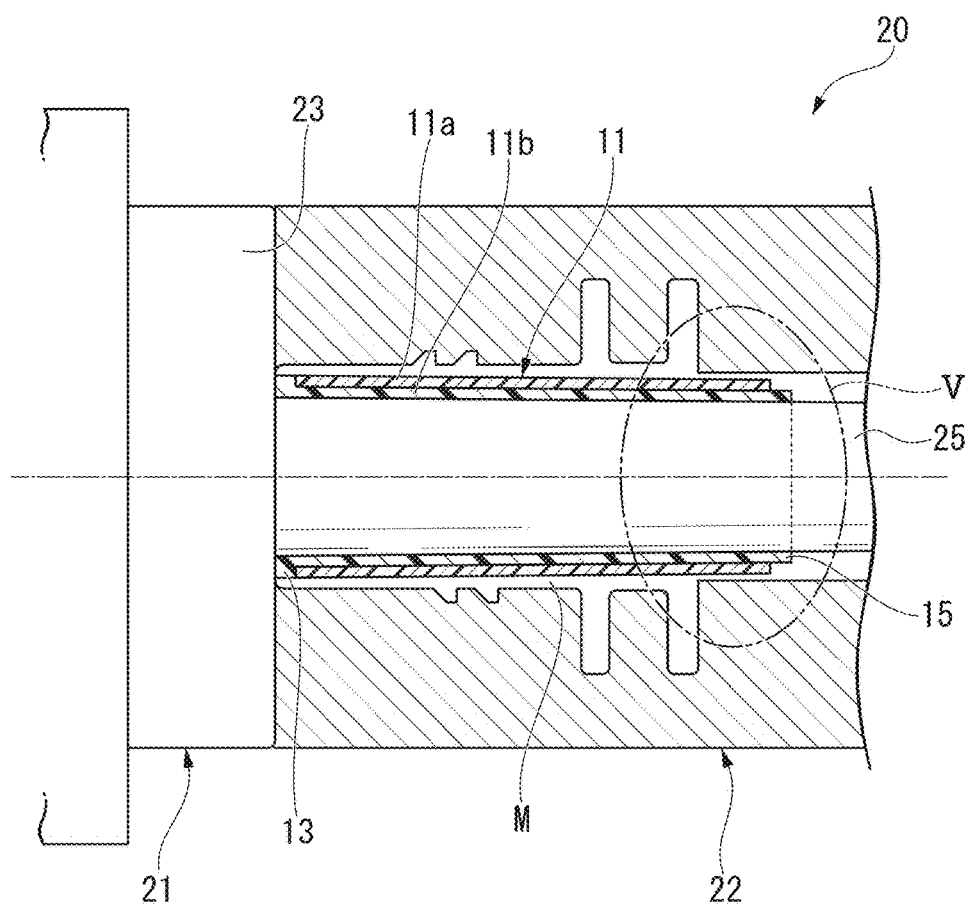
FIG. 4 is a sectional view along an axial direction of a molding mold of the embodiment of the present invention.
Figure 5:
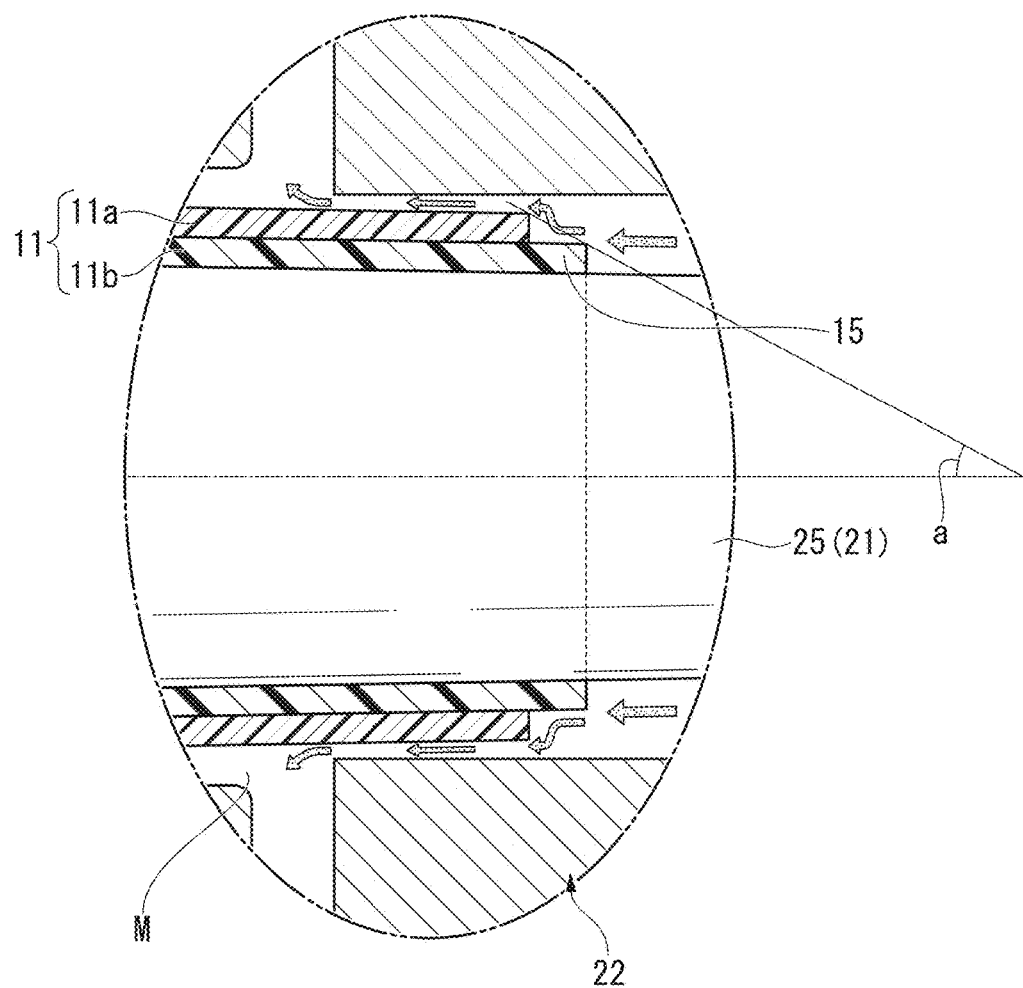
FIG. 5 is an enlarged view of a section V of FIG. 4 illustrating molding mold of the embodiment of the present invention.
Figure 6:
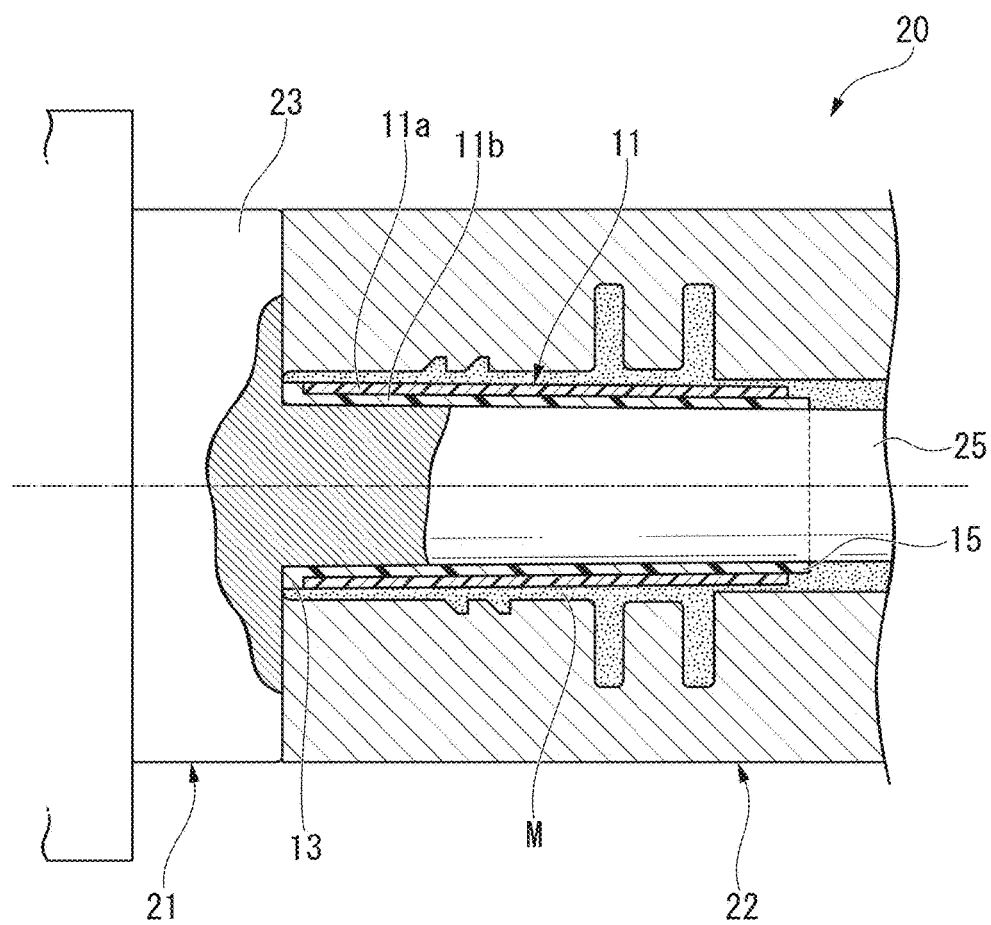
FIG. 6 is a sectional view along the axial direction of the molding mold of the embodiment of the present invention.

FIGS. 4 to 6 are diagrams showing a molding mold 20 (a mold) for molding the spout 1.

The molding mold 20 is provided with a core mold 21 for molding the inner peripheral surface and one end portion of the axial direction of the peripheral wall 10 (the peripheral wall main body part 10a) of the spout 1, and a cavity mold 22 for molding the outer surface and the other end portion (an end portion on the adhesion part 3 side or the outflow guide part 9 side) in the axial direction of the spout 1

The core mold 21 is provided with abase wall 23 for molding the end face on the anti-pouch side of the peripheral wall main body part 10a of the spout 1, and a substantially columnar molding shaft (a shaft part) 25 which is provided to be continuous to the base wall 23 and molds the inner peripheral surface (the pout hole 5) of the peripheral wall main body part 10a. The molding shaft 25 protrudes forward from substantially the central portion of the base wall 23, and at the time of molding, the blocking tube 11 is fitted onto the outer peripheral surface near the base wall 23. In this way, the end face on the anti-pouch side of the blocking tube 11 fitted to the molding shaft 25 is abutted against the front face of the base wall 23. Further, the molding shaft 25 is formed in a tapered shape in which it tapers toward the extending end side from the base wall 23 side. This tapered shape is set so as to almost match the tapered shape of the blocking tube 11.

On the other hand, the cavity mold 22 is configured of a plurality of split blocks capable of being divided in the radial direction and forms a molding space M for molding the spout 1 between itself and the core mold 21. An injection cylinder (not shown) for injecting and filling the melted base resin into the molding space M is connected to the cavity mold 22. The injection cylinder is connected to an end portion area on the side spaced apart from the core mold 21, of the cavity mold 22. The melted base resin introduced from the injection cylinder flows from the side spaced apart from the core mold 21 into the molding space M along the axial direction.

Subsequently, a method of manufacturing the spout 1 according to this embodiment will be described.

The blocking layer 11a and the covering layer 11b which configure the blocking tube 11 are prepared in advance, and the blocking layer 11a is fitted to the outer periphery side of the covering layer 11b. At this time, the taper directions of the covering layer 11b and the blocking layer 11a are aligned with each other, and the blocking layer 11a is fitted from the end portion on the reduced diameter side of the covering layer 11b. If the blocking layer 11a is fitted to the covering layer 11b in this way, the end face on the anti-pouch side of the blocking layer 11a comes into contact with the end portion restriction wall 13 on the same side of the covering layer 11b. The fitting of the blocking layer 11a to the covering layer 11b is completed at this point in time, and the covering layer 11b and the blocking layer 11a are integrated, whereby the blocking tube 11 is configured.

Next, the blocking tube 11 formed in this way on the molding shaft 25 of the core mold 21 by using an automatic assembly device such as a robot. At this time, the blocking tube 11 is aligned in the taper direction with that of the molding shaft 25, and the blocking tube 11 is fitted from the end portion on the reduced diameter side of the molding shaft 25. If the blocking tube 11 is fitted to the molding shaft in this way, the end face on the anti-pouch side of the blocking tube 11 comes into contact with the front face of the base wall 23 of the core mold 21. In this way, the blocking tube 11 is fitted and fixed to the molding shaft 25 in a press-fit state.

Thereafter, as shown in FIG. 4, the core mold 21 and the cavity mold 22 are clamped to each other, and thus the molding space M is formed between the core mold 21 and the cavity mold 22. The a holding space M formed in this way has a shape which covers the end portion on the pouch side and the area on oar the outer periphery side of the blocking tube 11.

Thereafter, the melted base resin is injected and filled from the injection cylinder (not shown) into the molding space M, as shown in FIGS. 5 and 6. If the melted base resin is injected from the bottom portion side of the cavity mold 22, the base resin touches with the end portion on the pouch side of the blocking tube 11 and then enters into the outer peripheral surface side of the blocking tube 11. At this time, the end portion on the pouch side of the blocking tube 11, which faces the flow of the base resin, has a stepped shape in which the end portion of the covering layer 11b on the inner periphery side protrudes in the axial direction from the end portion of the blocking layer 11a. For this reason, the base resin which has flowed to the end portion of the blocking tube 11 is guided by the stepped portion, thereby gradually changing direction so as to follow the outer peripheral surface of the blocking layer 11a, as shown by an arrow in FIG. 5. The base resin which has flowed to the outer peripheral surface side of the blocking layer 11a in this way advances until it abuts against the base wall 23 of the core a hold 21, and thus the molding space M is filled with the base resin.

Thereafter, mold opening of the core mold 21 and the cavity mold 22 is performed after waiting for the solidification of the base resin in the molding space M, and a molded product is taken out of the molding mold 20. Thereafter, post-processing such as deburring is performed on the molded product and the manufacturing of the spout 1 is completed.

The spout 1 manufactured in this way is embedded in the base resin with not only the end face on the pouch side of the covering layer 11b of the blocking tube 11, but also the outer peripheral surface of the protrusion area 15 of the covering layer 11b, which protrudes from the blocking layer 11a, being in contact with the base resin, as shown in FIG. 3.

For this reason, in the spout 1 according to this embodiment, the area of the joining portion between the covering layer 11b and the base resin in the vicinity of the end portion on the pouch side of the blocking layer 11a increases, and thus even in a case where it is necessary to thin the thickness of the covering layer 11b, it is possible to prevent the covering layer 11b from peeling from the base resin or the blocking layer 11a after the manufacturing, before it happens.

Further, in the case of the spout 1 according to this embodiment, the blocking layer 11a is embedded in the base resin without being entirely exposed to the outside of the spout 1, and therefore, it is possible to prevent deterioration from occurring in the blocking layer 11a, due to the contents passing through the pouring hole 5 at the time of use of the spout-attached pouch 100 coming into contact with the blocking layer 11a, before it happens.

Further, in the spout 1 according to this embodiment, the end portion on the pouch side of the covering layer 11b on the inner periphery side of the blocking tube 11 protrudes further toward the outside in the axial direction than the end portion of the blocking layer 11a on the outer periphery side, and therefore, even if there is a case where the melted base resin strongly comes into contact with the end portion on the pouch side in the axial direction of the blocking tube 11 along the axial direction at the time of injection molding, due to the shape of the stepped portion which is formed by the end portions of the covering layer 11b and the blocking layer 11a of the blocking tube 11, the flow of the base resin can be gradually changed so as to follow the outer peripheral surface of the blocking layer 11a.

For this reason, in the spout 1 according to this embodiment, at the time of injection molding, it is possible to make the base resin smoothly flow to the outer peripheral surface side of the blocking layer 11a without making a large flow pressure of the base resin act on the end portion on the pouch side of the blocking tube 11. Therefore, at the time of the injection and filling of the base resin into the molding space M, it is possible to prevent the end portion on the pouch side of the blocking tube 11 from being tuned up or vibrating under a large flow pressure from the base resin. Further, in the case of the spout 1, it is possible to suppress an exothermic shearing phenomenon due to a sudden flow of the base resin at the time of injection molding, and in addition, it is possible to prevent poor filling or the like of the base resin into the molding space M.

In particular, in the case of the spout ace 2 to this embodiment, the end portion on the pouch side of the blocking tube 11 is disposed in the adhesion part 3 having a substantially elliptical shape in which both end portions on the major axis side are crushed flatly, and therefore, it becomes effective in improvement of the product quality to make the flow of the base resin in a direction to the outer periphery side of the blocking layer 11a at the time of injection molding smooth. That is, also in sealing of the pouch 2 in a sealed state and also in a reduction in product variation due to thermal contraction, it is effective to make the end portions on the major axis side of the adhesion part 3 thinner. That is, if the end portions on the major axis side of the adhesion part 3 are made to be thin, it becomes difficult for the melted base resin to reach the end portions of the adhesion part 3 at the injection molding, and if it is a state where the flow of the resin in the direction to the outer periphery side of the blocking layer 11a is apt to be inhibited by the end portion on the pouch side of the blocking tube 11, it becomes difficult for the base resin to be filled to the distal portion of the adhesion part 3. Further, if the injection pressure of the base resin is increased in order to cope with this problem, a problem such as turning-up, deformation, or variation of the end portion of the blocking tube 11 due to a high flow pressure of the base resin, or material deterioration due to shearing heat generation occurs. In contrast, in the spout 1 according to this embodiment, it is possible to make the flow of the base resin in the direction to the outer periphery side of the blocking layer 11a at the time of injection molding smooth, as described above, and therefore, it is possible to reliably fill the base resin to the distal portion of the adhesion part 3 without greatly increasing the injection pressure of the base resin. Therefore, in the case of the spout 1 according to this embodiment, it is possible to easily improve the product quality.

It is preferable that the lengths of the end portions on the pouch side of the blocking layer 11a and the covering layer 11b be set such that the end portion of the blocking layer 11a having oxygen barrier properties is located on the inside of the pouch 2 when the spout 1 is attached to the pouch 2 and that an angle a between a line segment connecting the corner portions on the outer periphery side of the covering layer 11b and the blocking layer 11a and the axial center of the blocking tub 11 be less than or equal to 45°, as shown in FIG. 5.

Due to such a setting, it is possible to more effectively obtain oxygen barrier performance by the pouch 2 and the blocking layer 11a, and furthermore, it is possible to obtain a smoother flow of the base resin in the direct on to the outer periphery side of the blocking layer 11a at the time of injection molding.

Further, a configuration may be made in which the corner portions on the outer periphery side of the covering layer 11b and the blocking layer 11a are formed so as to have an arc-shaped cross-section, whereby the flow in an outer periphery direction of the blocking layer 11a at the time of injection molding is made to be smoother.

Further, in the spout 1 according to this embodiment, the blocking tube 11 is formed in a tapered shape in which it is tapered in a direction in which the melted base resin is introduced at the time of injection molding, and therefore, it is possible to make the melted base resin more smoothly flow to the outer peripheral surface side of the blocking tube 11 along the tapered shape at the time of injection molding. Therefore, in the case of this embodiment, also due to the tapered shape of the blocking tube 11, it is possible to suppress vibration of the blocking tube 11 at the time of injection molding.

Further, in the case of the spout 1 according to this embodiment, the end portion restriction wall 13 with which the end face in the axial direction of the blocking layer 11a comes into contact is formed at the end portion on the anti-pouch side of the covering layer 11b configuring the blocking tube 11, and therefore, when assembling the blocking layer 11a and the covering layer 11b, the blocking layer 11a and the covering layer 11b can be easily positioned by bringing the end face of the blocking layer 11a into contact with the end portion restriction wall 13 of the covering layer 11b. Further, when injection-molding the spout 1, even if there is a case where the melted base resin strongly comes into contact with the end portion on the pouch side of the blocking tube 11, it is possible to prevent the occurrence of a position shift between the blocking layer 11a and the covering layer 11b.

Figure 7:
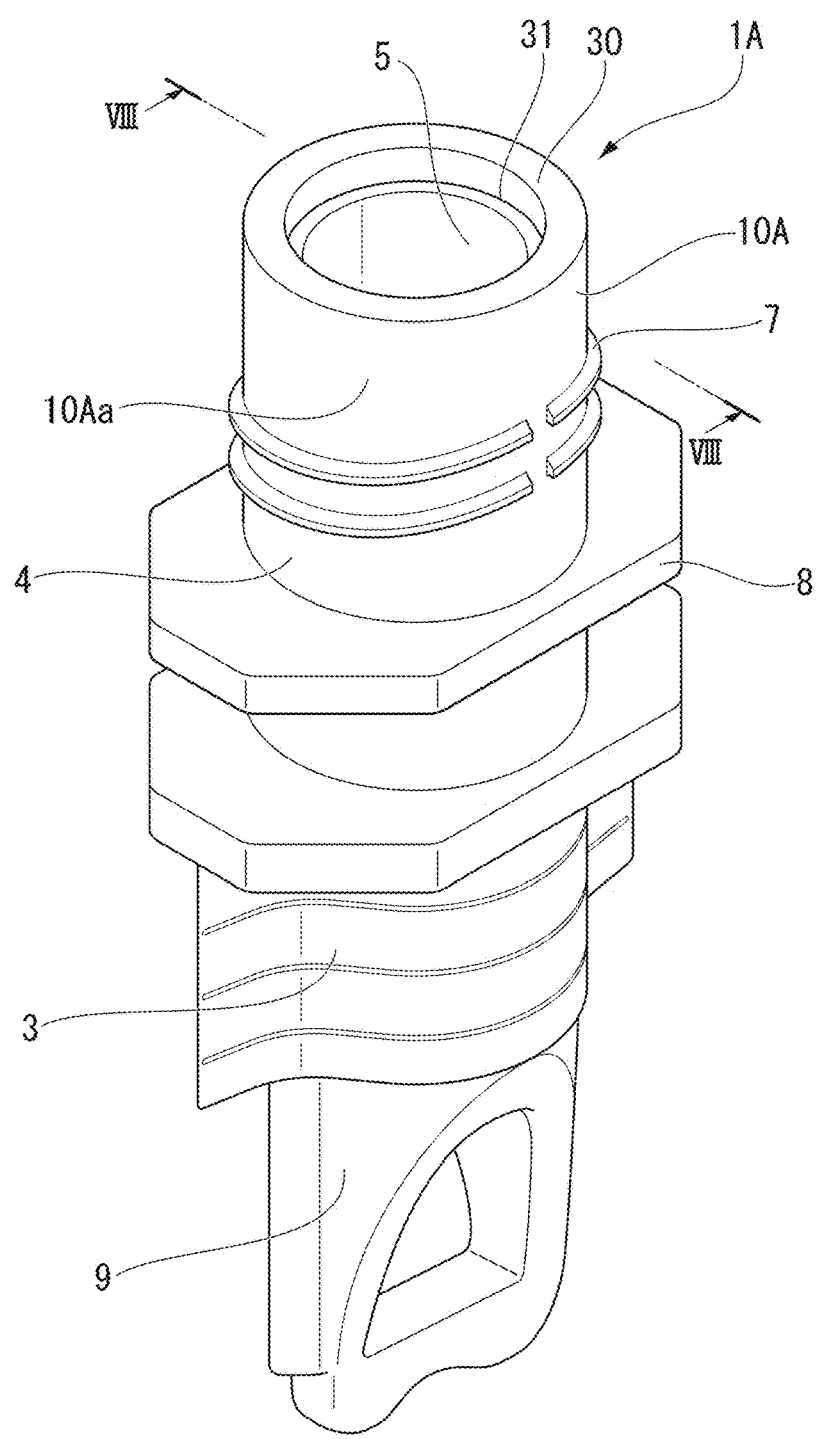
FIG. 7 is a perspective view of a spout a pouch of another embodiment of the present invention.
Figure 8:
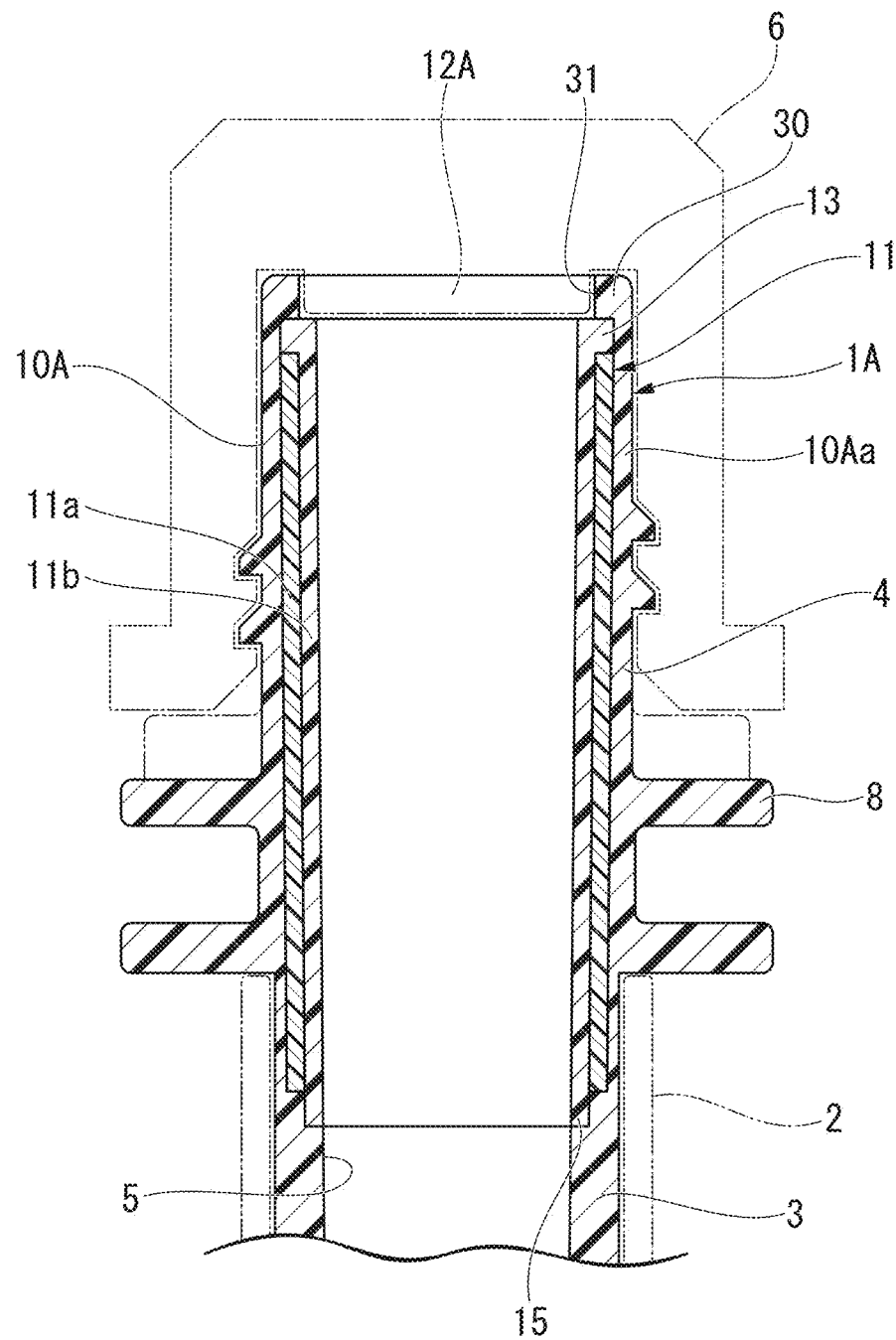
FIG. 8 is a sectional view corresponding to a cross-section along line VIII-VIII of FIG. 7 of the spout for a pouch of another embodiment of the present invention.
Figure 9:
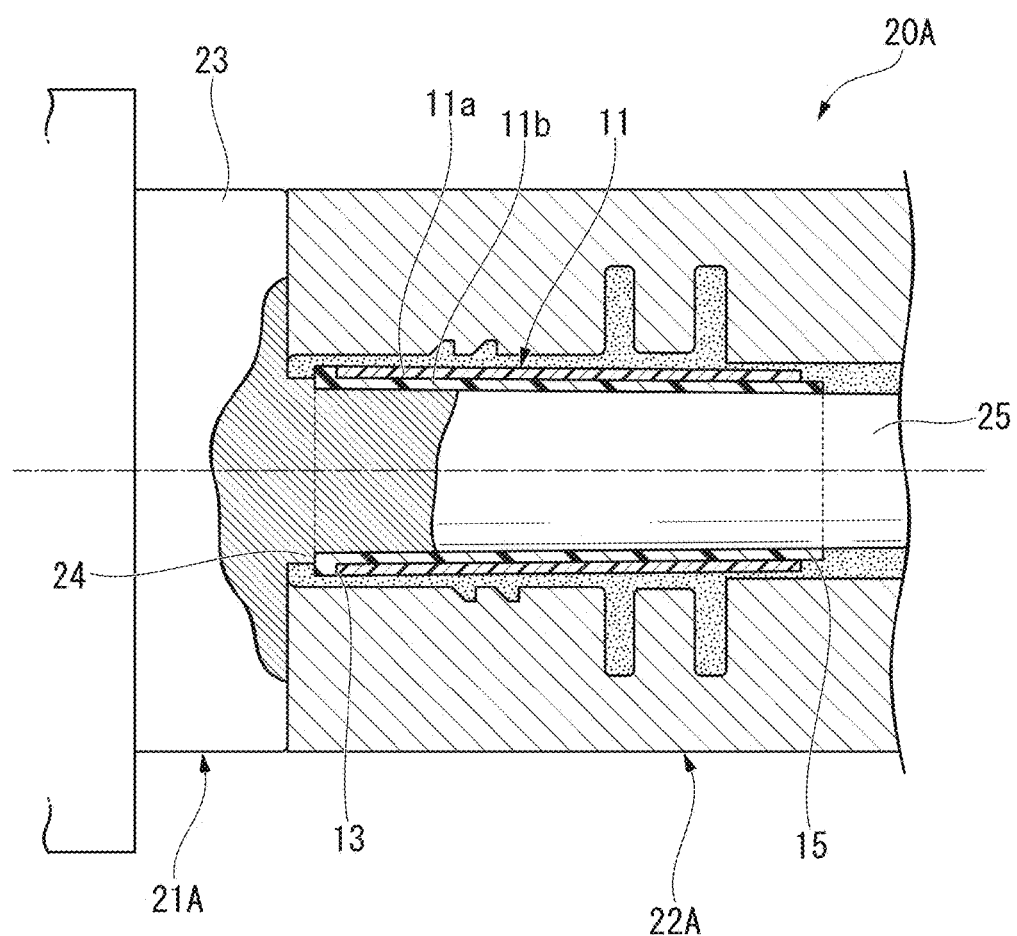
FIG. 9 is a sectional view along the axial direction of a molding mold of another embodiment of the present invention.

FIGS. 7 and 8 are diagrams showing a spout for a pouch 1A (hereinafter defined as a "spout 1A") according to another embodiment, and FIG. 9 is a diagram showing a molding mold 20A (a mold) for molding the spout 1A. In another embodiment, the same parts as those in the above-described embodiment are denoted by the same reference numerals.

The basic configuration of the spout 1A according to another embodiment is substantially the same as that of the above-described embodiment. However, this embodiment is different from the above-described embodiment in that an annular extension wall 30 is provided at an end portion of a peripheral wall main body part 10Aa of a peripheral wall 10A so as to cover an outer peripheral edge portion of the end face on the anti-pouch side of the blocking tube 11 and an annular recessed portion 31 having a stepped shape is provided between the inner peripheral surface of the extension wall 30 and the end face on the anti-pouch side of the blocking tube 11.

Further, the molding mold 20A shown in FIG. 9 is different from that of the above-described embodiment in that a recessed portion of the cavity mold 22A is changed to a shape allowing the extension wall 30 to be molded and a stepped portion 24 for molding the annular recessed portion 31 is provided between the base wall 23 and the molding shaft 25 of a core mold 21A.

In the spout 1A according to another embodiment it is possible to obtain the same effects as those in the above-described embodiment, and addition, it is possible to stably fit a large-diameter seal part 12A of the cap 6 to the annular recessed portion 31 of the end face of the peripheral wall main body part 10Aa. Further, in the case of the spout 1A, it is possible to partially enlarge the area of an opening end portion of the mouth part 4 by the annular recessed portion 31 of the end face of the peripheral wall main body part 10Aa. For this reason, there is also an advantage in that when the spout 1A is attached to the pouch and the pouch filled with the contents through the opening of the mouth part 4, a sufficient gap is provided between the filling nozzle for the contents and the opening of the mouth part 4, and thus it is possible to easily perform the filling of the contents.

The present invention is not limited to the embodiments described above, and various design changes can be made within a scope which does not depart from the gist of the present invention.

Figure 10:
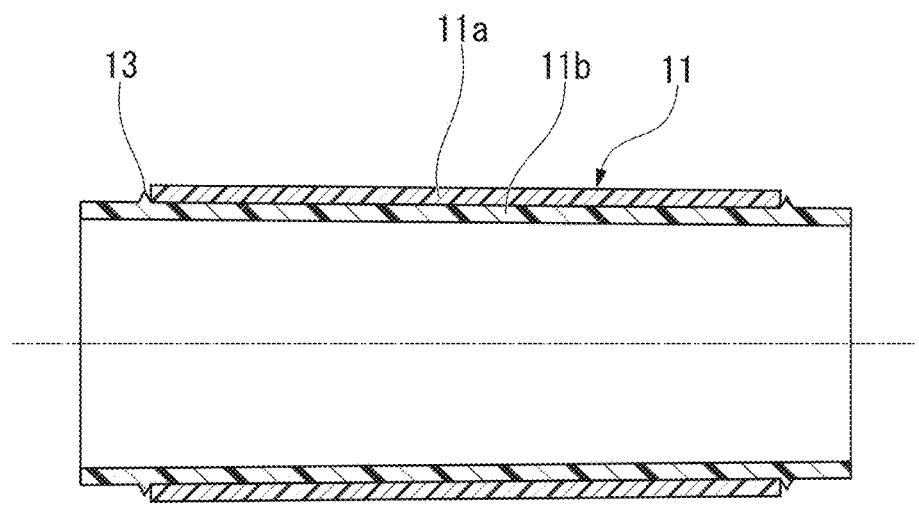
FIG. 10 is a sectional view along the axial direction of a molding mold showing a modification example of the present invention.

For example, as shown in FIG. 10, a configuration may be made in which end portions on both sides (the pouch side and the anti-pouch side) of the covering layer 11b of the blocking tube 11 protrude further toward the outside in the axial direction than the end portion on the anti-pouch side of the blocking layer 11a and the end portion restriction wall 13 protruding to the outside in the radial direction is provided at each of these end portions.

The end portion restriction wall 13 in this case restricts excessive displacement of the blocking layer 11a in the anti-pouch direction due to the end face on the anti-pouch side of the blocking layer 11a coming into contact with the end portion restriction wall 13 when the blocking layer 11a is fitted onto the outer peripheral surface of the covering layer 11b.

Further, the radially outward overhanging width of the end portion restriction wall 13 is set to be thinner than the thickness of the outer end portion of the blocking layer 11a so as to be able to fit the blocking layer 11a to the covering layer 11b. In a case of using the covering layer 11b configured in this way, the blocking layer can be fitted to the covering layer from either direction on the pouch side and the anti-pouch side, and therefore, also in a case of the fining to the mold, there is no restriction on a direction. For this reason, even if speed-up of a molding device is made, it is possible to cope with this.

INDUSTRIAL APPLICABILITY

According to the present invention, it is possible to provide a spout for a pouch in which it is possible to more reliably suppress peeling of a covering layer of a blocking tube, and at the time of manufacturing, it is possible to suppress deformation or vibration of the blocking tube due to the flow pressure of a melted base resin and it is possible to make the melted base resin smoothly flow into a mold, a spout-attached pouch, and a method of manufacturing the spout for a pouch.

REFERENCE SIGNS LIST 1, 1A: spout (spout for pouch)
2: pouch
5: pouring hole
10, 10A: peripheral wall
11: blocking tube
11a: blocking layer
11b: covering layer
13: end portion restriction wall
20, 20A: molding mold (mold)
25: molding shaft (shaft part)

The invention claimed is:

1. A method of manufacturing a spout for a pouch, which has a pouring hole making inside and outside of the pouch communicate with each other, and in which a blocking tube is embedded in a base resin of a peripheral wall surrounding the pouring hole, the method comprising:

a process of forming the blocking tube by preparing a tubular blocking layer and a tubular covering layer made of a material of a same quality as the base resin and assembling the blocking layer such that at least an inner peripheral surface of the blocking layer is in contact with an outer periphery side of the covering layer and one end portion side in an axial direction of the covering layer protrudes further toward outside in the axial direction than an end portion on the same side in the axial direction of the blocking layer;

a process of externally fitting the blocking tube onto a shaft part of a mold for molding a pouring hole, and in this state, setting the blocking tube in the mold such that the one end portion side in the axial direction of the covering layer faces an introduction direction of the base resin; and a process of injecting and filling a melted base resin into the mold such that the base resin goes around an end face on the one end portion side in the axial direction of the covering layer, an outer peripheral surface of the covering layer, which protrudes from an end portion in the axial direction of the blocking layer to outside in the axial direction, and an outer periphery side of the blocking layer.

* * * * *